United States Patent [19]
Little

[11] Patent Number: 4,475,790
[45] Date of Patent: Oct. 9, 1984

[54] FIBER OPTIC COUPLER

[75] Inventor: Roger G. Little, Bedford, Mass.

[73] Assignee: Spire Corporation, Bedford, Mass.

[21] Appl. No.: 342,485

[22] Filed: Jan. 25, 1982

[51] Int. Cl.³ .............................................. G02B 7/26
[52] U.S. Cl. ................ 350/96.21; 350/96.22
[58] Field of Search ............. 350/96.21, 96.23, 96.22

[56] References Cited

U.S. PATENT DOCUMENTS

| | | | |
|---|---|---|---|
| 2,871,110 | 1/1959 | Stead | 41/42 |
| 2,927,011 | 3/1960 | Stead | 41/42 |
| 2,973,253 | 2/1961 | Stead | 41/42 |
| 3,397,278 | 8/1968 | Pomerantz | 174/52 |
| 3,417,459 | 12/1968 | Pomerantz et al. | 29/472.9 |
| 3,557,629 | 1/1971 | Quermann | 74/5.6 |

FOREIGN PATENT DOCUMENTS 2026718  2/1980  United Kingdom ............. 350/96.23

OTHER PUBLICATIONS

C. M. Miller, "Fiber-Optic Array Splicing with Etched Silicon Chips", *The Bell System Tech. J.*, vol. 67, No. 1, Jan. 1978; pp. 75-89.
E. Bassous, "Fabrication of Novel Three-Dimensional Microstructures by the Anisotropic Etching of (100) and (110) Si", IEEE (1978), vol. ED25-No. 10, pp. 1178-1184.
K. E. Bean, "Anisotropic Etching of Silicon", IEEE, vol. ED-25, No. 10, Oct. 1978, pp. 1185-1193.
A. D. Brooks et al., "Low Temp. Electrostatic Si-to-Si Seals using Sputtered Borosilicate Glass", J. Electrochem. Soc., vol. 119, No. 4 Apr. 1972, pp. 125-126.

*Primary Examiner*—John D. Lee
*Assistant Examiner*—Robert E. Wise
*Attorney, Agent, or Firm*—Morse, Altman & Dacey

[57] ABSTRACT

A high resolution, rugged fiber optic coupler for use in optical data transmission systems and method of its manufacture. The fiber optic coupler includes a pair of thin silicon wafers having preferentially etched complementary opposed V-grooves. A very thin layer of a deformable hard glass is used as the lining for the V-grooves and also for covering one of the opposed surfaces of the pair of wafers. An optical fiber is held securely within a pair of opposed complementary V-grooves by the deformable hard glass lining. Preferably, the pair of silicon wafers is joined to each other, with the optical fiber held therebetween in the opposed V-grooves, by electrostatic bonding.

22 Claims, 8 Drawing Figures

FIBER OPTIC COUPLER

BACKGROUND OF THE INVENTION

1. Field of the Invention

The present invention relates generally to fiber optic couplers and, more particularly, to a high resolution, rugged, multichannel, low-loss fiber optic coupler for use in optical data transmission systems and method of its manufacture.

2. The Prior Art

Optical fibers have been used extensively in medical and scientific instruments, such as for example, in endoscopes and cystoscopes. More recently, optical fibers have found ever increasing applications in optical communications. Light transmitted down an optical fiber is equivalent to an electrical signal passing down a conventional copper wire. The optical fiber possesses many advantages over the copper wire, however. These advantages include a greater information carrying capacity, a complete freedom from electrical or magnetic interference, and considerable reductions in size and weight. For example, a single optical fiber can transmit simultaneously many thousand telephone conversations. The optical fiber must be able to transmit light with little attenuation, at times over great distances of hundreds or even thousands of meters. This presents little problem so long as there is no requirement for a break in the optical fiber, such as at points of coupling, due to the near total internal reflection exhibited by the optical fiber. A communication system requires couplings, however. Some of these couplings are in hostile environments. For instance, a coupling may be required to a spacecraft in space or to a submarine deep in the ocean. It is at these couplings that attenuations occur. Most of the attenuations are the result of misalignment of the respective ends of the abutting optical fibers. Since optical fibers are very thin, with an average core diameter varying between 50 and 100 micrometer, the task of properly aligning their abutting ends, especially in a multichannel coupler, is an exacting one. In addition, the coupler must be structurally rugged, yet of relatively small size and weight. The coupler also must be cost effective.

Presently, fiber optic couplers rely, for the most part, either on precision machined components or on precisely molded components, or a combination thereof. Despite the high costs involved in these processes, the resultant fiber optic couplers nevertheless have been less than satisfactory. Most of these fiber optic couplers exhibit unacceptable levels of attenuation. This problem of high degree of attenuation places a real burden on communication systems employing optical fibers and couplers.

SUMMARY OF THE INVENTION

It is a principal object of the present invention to overcome the above disadvantages by providing a high resolution, rugged, multichannel, low-loss fiber optic coupler for use in optical data transmission systems and its method of manufacture.

More specifically, it is an object of the present invention to provide a fiber optic coupler for use in optical data transmission systems comprising at least a pair of thin wafers superposed along a common surface, each wafer having at least one complementary opposed V-groove in its surface, a very thin layer of deformable hard glass deposited on the surface and in the V-groove of one of the wafers and in the V-groove only of the other wafer, and an optical fiber accurately held in the complementary opposed V-grooves by the very thin layer of deformable hard glass. Preferably, the wafers are formed of (110) orientation crystal silicon and the V-grooves are formed therein by preferential etching. Preferably, the thermal expansion coefficient of the deformable hard glass layer closely parallels that of the silicon wafers. Preferably, the superposed wafers are electrostatically bonded to each other along their common surfaces. Further preferably, the complementary opposed V-grooves surrounding the optical fiber are filled with a low viscosity material by vacuum impregnation.

Other and further objects of the present invention will in part be obvious and will in part appear hereinafter.

The invention accordingly comprises the fiber optic coupler of the present disclosure, its components, parts, their interrelationships, and its method of manufacture, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein.

DETAILED DESCRIPTION OF THE PREFERRED EMBODIMENT

Figure 1:
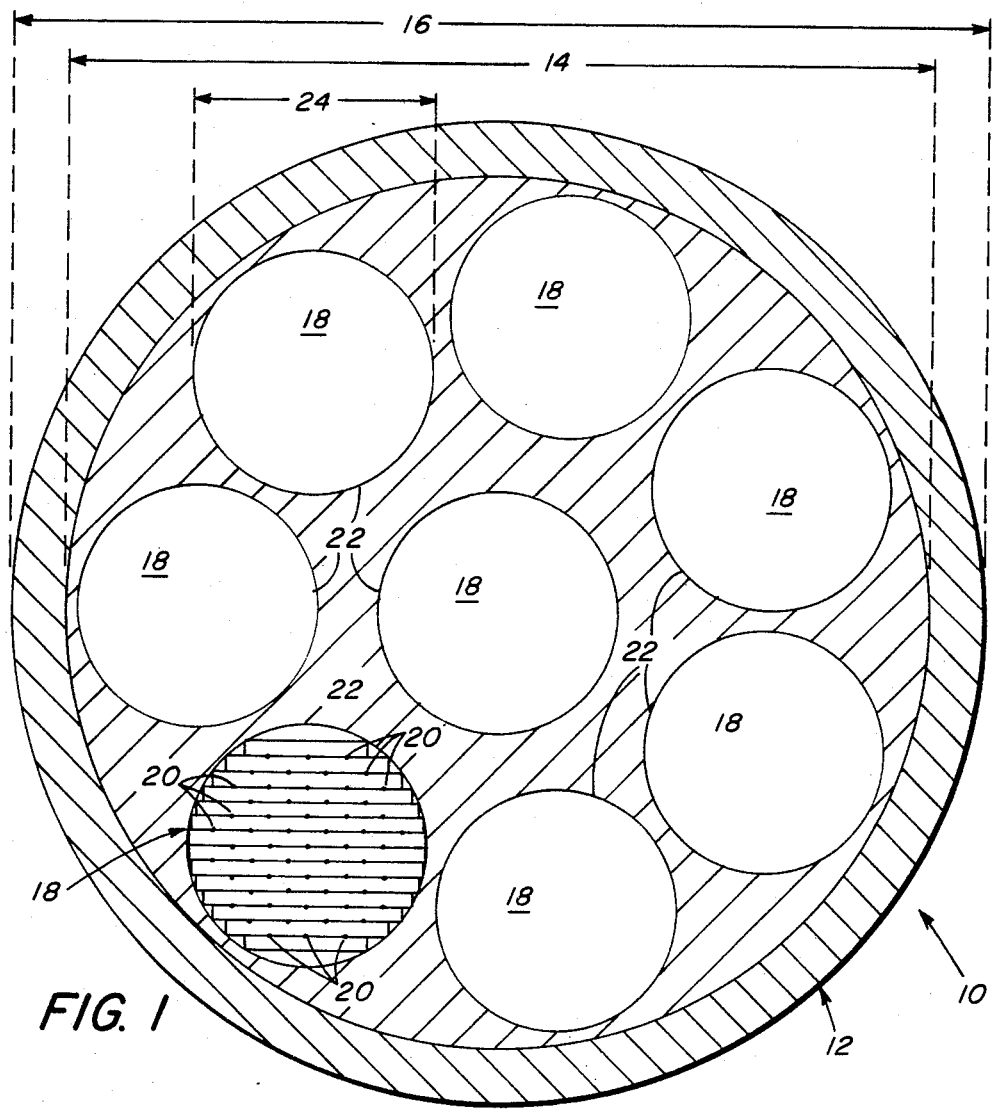
FIG. 1 is a schematic vertical section of a multichannel fiber optic coupler constructed in accordance with the present invention.
Figure 2:
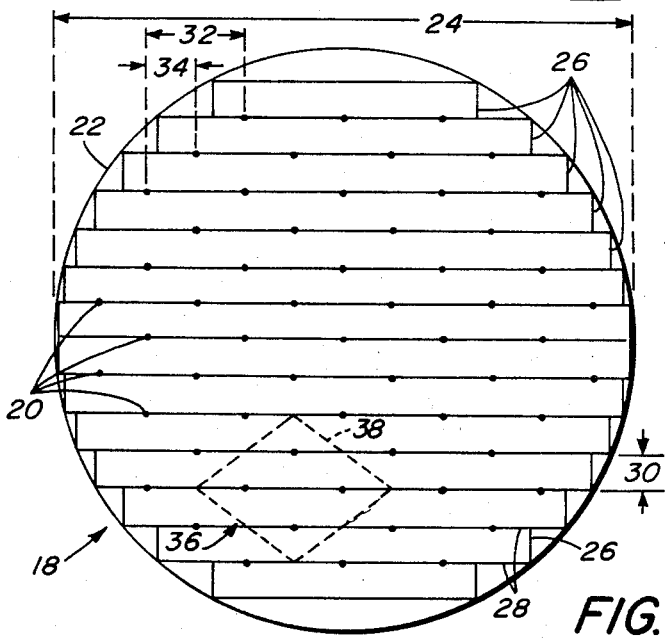
FIG. 2 is a similar view but showing only a part, on an enlarged scale, of the multichannel fiber optic coupler of FIG. 1.

In general, FIG. 1 illustrates, in schematic vertical section, a high resolution, multichannel fiber optic coupler 10 developed for use in an optical data transmission system. When the polished ends of two such couplers 10 are joined in abutting relation, an optical coupling is effected. The illustrated multichannel fiber optic coupler 10 is capable of accommodating at least 450 channels and as such, is particularly useful in applications, among others, as a coupler in a single submarine hull penetrator. To be useful as a coupler for use in a single submarine hull penetrator, according to naval requirements, the fiber optic coupler 10 must be designed so as to accommodate all of the 450+ channels within a flexible cable 12 having an internal diameter 14 of about 35.1 mm (1.38"), and an external diameter 16 of about 40.9 mm (1.61"). These requirements are met, according to the invention, by placing eight individual fiber bundles 18 within the cable 12. Each fiber bundle 18, shown in more detail and on an enlarged scale in FIG. 2, is designed to accommodate between about 56 and 59 channels 20 within a circular jacket 22. The jacket 22 is formed with an external diameter 24 of about 10.2 mm (0.40"). These eight individual fiber bundles 18 are, of course, manufactured separately and are then potted within the cable 12.

Figure 3:
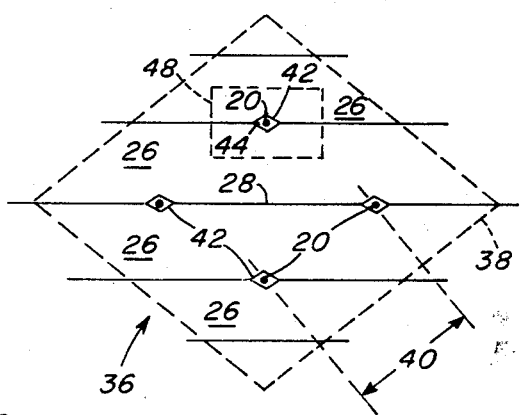
FIG. 3 is a representative portion, on an enlarged scale, of the part shown in FIG. 2.

The fiber bundle 18 preferably comprises a plurality of thin wafers 26, with each wafer 26 formed with two opposed parallel flat surfaces 28. Each wafer 26 preferably is about 0.635 mm (0.025"=25 mils) thick, measured as at 30. Preferably, the distance 32 separating adjacent fiber optic channels 20 located in the same plane is about 1.65 mm (0.065"=65 mils), and the distance 34 between two channels 20 located in adjacent planes is about 0.83 mm (0.033"=33 mils). A portion 36 of the fiber bundle 18 shown in FIG. 2 and found within the dashed lines 38 is shown, on an enlarged scale, in FIG. 3. This view indicates that there is a center-to-center fiber spacing 40 between two fiber channels 20 located in adjacent planes, and this fiber spacing 40 preferably is about 1.04 mm (0.041"=41 mils). FIG. 3 also indicates, for the first time due size limitations, the presence of complementary opposed V-grooves 42 formed in the two opposed parallel flat surfaces 28 of each of the thin wafers 26. It will be evident that the fiber optic channel 20 is disposed within a rhombic cavity 44 formed by two complementary opposed V-grooves 42. A further portion 46, of the portion 36 of FIG. 3, delineated within the dashed lines 48, is shown, on a further enlarged scale, in FIG. 4.

Figure 4:
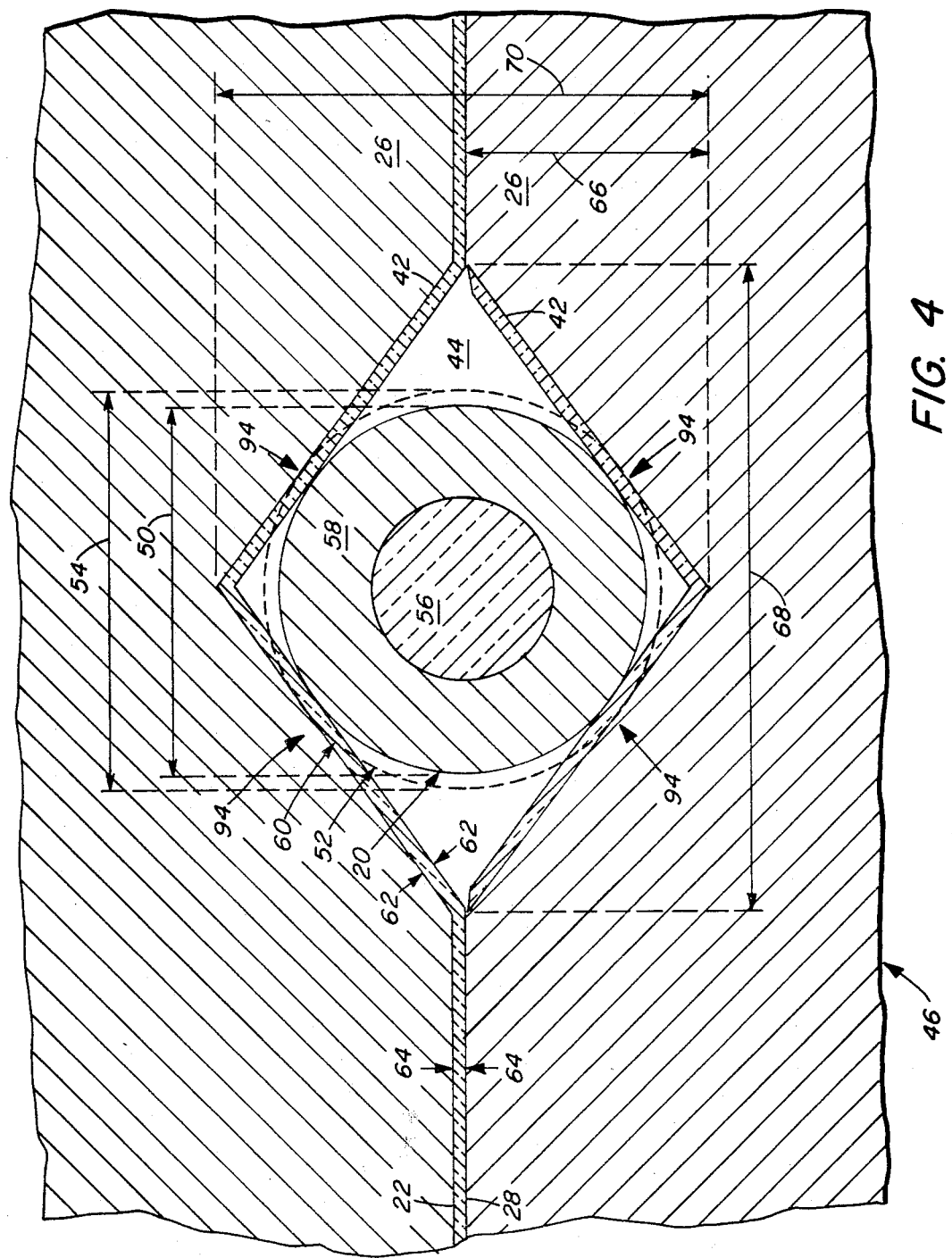
FIG. 4 is a further portion, on a further enlarged scale, of the representative portion shown in FIG. 3.

As shown in FIG. 4, the fiber optic channel 20 preferably has a diameter 50 of about 136 micrometers. The fiber optic channel 20 may, however, be somewhat larger, as shown by the dashed circle 52, and possess a maximum diameter 54 of about 144 micrometers, or any variation in fiber size between 136 and 144 micrometers. Each fiber optic channel 20 preferably comprises a cylindrical core 56 of material, herein preferably nondeformable fused silica, clad with a material 58 of lower refractive index, such as glass. Of course, the core 56 also may be formed of glass or plastic, provided always that its refraction index is higher than that of the cladding material 58 in order to prevent light loss (attenuation). If desired, the cladding material 58 also may incorporate in its outer periphery, a thin layer, (not shown) preferably less than 0.95 micrometer, to provide the channel 20 with added durability and insensitivity to microbending effects.

The variations in fiber size for the fiber optic channel 20 are made possible by the presence of a very thin layer 60 of deformable hard glass lining each of the complementary opposed V-grooves 42 and also covering one of the opposed parallel flat surface 28. The preferred thickness of this very thin layer 60 of glass is about four micrometer, both in the V-grooves 42, note the opposed arrows 62, and along the surface 28, note the opposed arrows 64. Preferably, the layer 60 is formed from Corning 7070 glass and deposited in the V-grooves 42 and on the surface 28 by radio-frequency (RF) sputtering. The depth of each of the V-grooves 42 preferably is about 86 micrometers (microns) as shown by the arrow 66, its preferred width about 244 microns as shown by the arrow 68, and the preferred distance between the deepest points of two complementary opposed V-grooves 42 is about 176 microns, as indicated by the arrow 70, allowing for the four microns thickness of the glass layer 60 in between the wafers 26.

It must be pointed out that the invention, while thus far described with reference to the multichannel fiber optic coupler 10 illustrated in FIG. 1, equally is applicable to any fiber optic coupler built according to the disclosure herein, whatever the number of its channels 20, including a single-channel fiber optic coupler, not shown. The fiber optic coupler 10 of the invention, whether it be a multichannel one as illustrated or a single-channel one, not shown, is characterized by accurately positioning the fiber optic channels 20 and by maintaining the structural integrity of the coupler 10 in hostile environments, be it in space or deep under water. As mentioned, extrinsic losses (attenuation) of present day fiber optic couplers are due primarily to causes such as lateral and/or angular misalignment of the fibers, separation of the fiber ends and distortion of the fibers. Most, if not all, of these extrinsic losses (attenuation) are eliminated by the practice of the present invention. It is the precision-formed complementary opposed V-grooves 42 and the thin layer 60 of deformable hard glass that are principally responsible for securely and accurately holding, in precise positioned alignment, the fiber optic channels 20 of the coupler 10. And it is the preferred joining of two adjacent wafers 26, observe FIG. 4, that is primarily responsible for maintaining the structural integrity of the coupler 10. The V-grooves 42 preferably are formed in the wafers 26 by preferential etching, as more fully described below, and the preferred joining of the wafers 26 is effected by electrostatic bonding, also as more fully described below. Preferably, the plurality of the wafers 26 are formed of silicon and, more precisely of (110) orientation crystal silicon. Of course, (100) orientation Si can be used as well. Further preferably, the V-grooves 42 are formed by perferentially etching the (110) orientation crystal silicon wafers 26 until the (111) planes thereof are fully exposed so as to form the walls of the V-grooves 42.

In the processing of silicon semiconductors, wet chemical etching has been known and used for quite sometime. See U.S. Pat. Nos. 2,871,110; 2,927,011 and 2,973,253. These were isotropic etches in which the etch proceeded at the same rate in all directions. More recently, anisotropic etching of silicon has been developed. In anisotropic etching, the etch rate in one direction is considerably greater than in another direction. For a thorough discussion of anisotropic (i.e., preferential) etching, see "Anisotropic Etching of Silicon," by K. E. Bean, IEEE Trans. Electron Devices, Vol. ED-25, No. 10 (Oct. 1978), pp. 1185-1193. See also "Fabrication of Novel Three-Dimensional Microstructures by the Anisotropic Etching of (100) and (110) Silicon," by E. Bassons, in the same IEEE publication, on pp. 1178-1184. Anisotropic etching also has been employed for splicing optical fibers, see "Fiber-Optic Array Splicing with Etched Silicon Chips," by C. M. Miller, *The Bell System Technical Journal*, No. 67, No. 1 (Jan. 1978), pp. 75-89. As is evident from these articles, directional dependence of etch rates results in insensitivity of the depth 66 of the V-grooves 42 to etch parameters, such as time. Due to preferential etching, consistent V-groove depth 66 and exact shaping of the V-grooves 42 is achievable on a regular basis.

Figure 6:
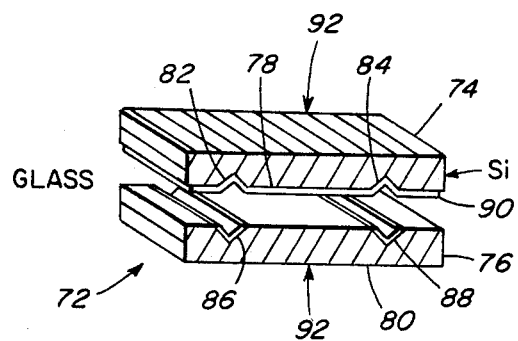
FIGS. 6–8 illustrate certain principles of the present invention.

In FIG. 6, there is illustrated a design 72 for a two-channel fiber optic coupler, including a pair of thin silicon wafers 74 and 76. Preferably, each of the wafers 74 and 76 is formed (110) orientation crystal silicon. Each of the wafers 74 and 76 is provided, on their respective opposed surfaces 78 and 80, with a pair of complementary opposed V-grooves 82, 84 and 86, 88, respectively. All of the V-grooves 82, 84, 86 and 88, but only one of the opposed surfaces 78 and 80, are lined with a very thin layer 90 of deformable hard glass. The design 72 is ready for the placement of two optical fibers, not shown, within the pair of V-grooves 86 and 88. Following that, the pair of wafers 74 and 76 are united to each other along their respective opposed surfaces 78 and 80 by electrostatic bonding. Electrostatic bonding, as more fully described in U.S. Pat. Nos. 3,397,278; 3,417,459 and 3,557,629 and in an article "Low-Temperature Electrostatic Silicon-to-Silicon Seals Using Sputtered Borosilicate Glass," by A. D. Brooks et al, *Journal of the Electrochemical Society*, Vol. 119, No. 4 (April 1972) pp. 125-126, is a field assisted glass sealing technique. Electrostatic bonding provides a permanent structure of high structural integrity by chemically bonding together the coupler elements, that is the pair of silicon wafers 74 and 76. In addition to a stable structure, the electrostatic bonding method preserves the accuracy achieved in the fiber alignment by the pairs 82, 84 and 86, 88 of complementary opposed V-grooves. As a result, coupler performance and reliability have been materially improved.

Preferably, the electrostatic bonding step is effected in the presence compressive pressure of about 200 p.s.i. to about 300 p.s.i., as indicated by the arrows 92, 92, applied to the wafers 74 and 76. Due to this compressive pressure and a temperature between about 200° C. to about 500° C. required for electrostatic bonding, a plurality of simultaneous, symmetrically applied forces 94, 94, 94, 94 are generated (see FIG. 4). These forces cooperate to deform the layer 60, and thus embed the fiber optic channel 20, in the hard glass layer 60 with a built-in self-centering feature that effects and maintains precise fiber alignement despite variations, within the noted limits, in fiber size. As a consequence, the fiber optic channel 20 remains centered in the fiber optic coupler at the plane of the wafer-wafer 26, 26 interface despite fiber diameter variations.

Figure 5:
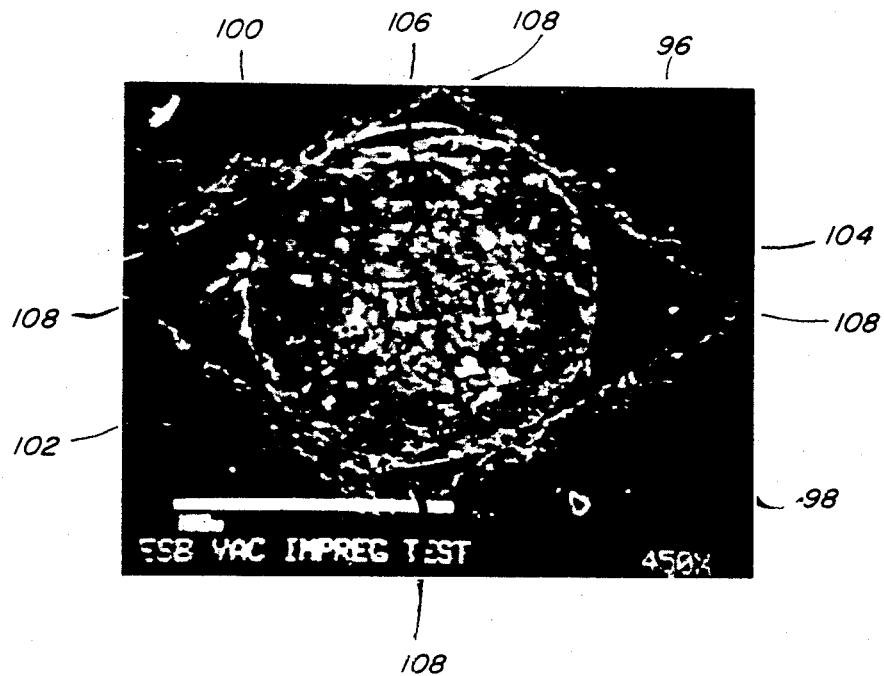
FIG. 5 is a photograph, on an enlarged scale, of a vertical section of a portion of a fiber optic coupler constructed in accordance with the present invention and being similar to the schematic view shown in FIG. 4.

The very thin layer 60 of glass cannot fill the voids around the optical fiber, however. These voids preferably are filled, following electrostatic bonding, during a secondary void filling operation. This secondary void filling preferably is accomplished by introducing a low viscosity material (as for example, Emerson & Cummings Stycast 1264) into the voids by vacuum impregnation. The results of this secondary void filling are shown in FIG. 5, which is a photograph, on an enlarged scale, of a vertical section of a fiber optic coupler constructed according to the invention. There is shown portions of a pair 96, 98 of silicon wafers, each provided with complementary opposed V-grooves 100, 102 having a very thin layer 104 of deformable hard glass securely holding an optical fiber 106 precisely centered therein. The voids surrounding the fiber 106 are shown as filled with a low viscosity filler material 108.

Due to the elevated temperatures required to effect electrostatic bonding, it is important that the thermal expansion coefficient of the deformable hard glass layer 104 closely parallels that of the silicon forming the wafers 96 and 98 over the temperature range of interest, being between ambient room temperature to about 550° C. Corning 7070 glass does fit this requirement. This thermal coefficient matching between the silicon wafers 96, 98 and the layer 104 of hard glass not only prevents unwanted additional internal stresses to be introduced into the process, but rather it provides some desired stress relief. For, some internal stresses are inherent in the process, particularly due to the different thermal expansion coefficients of the fused silica optical fiber 106 and of the silicon wafers 96 and 98. These internal stresses are, however, well below the fracture strengths of both the fiber 106 and of the wafers 96 and 98.

Figure 7:
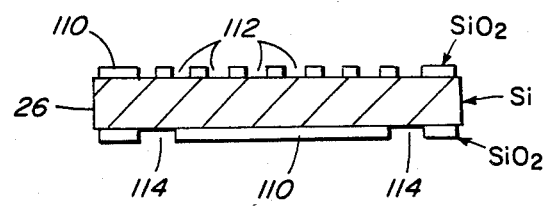
Figure 8:
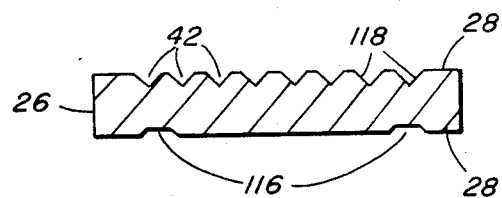

The preferred method of forming the multichannel fiber optic coupler 10 is best described in the following example and with particular reference to FIGS. 7 and 8.

EXAMPLE

A plurality of thin wafers 26 of P-type (110) orientation crystal silicon and of the dimensions described with reference to FIGS. 1-4 were provided in conventional manner by wafer slicing. The surfaces 28 of the wafers were cleaned, preferably in hydrofluoric acid and polished flat to within about two microns to assure that their opposed surfaces 28, 28 were both free of any residual oxides and parallel to one another. Both surfaces 28, 28 of the wafers 26 were then covered by SiO$_2$ films 110, thermally grown in steam at about 1000° C. to about 1 mm thickness. An etch mask, precisely aligned with the (100) axis, was then prepared in the SiO$_2$ films, using photo lithography technique for effecting openings 112 and/or 114, the former for determining the location of the V-grooves 42 and, the latter the location of suitable positioning grooves 116. (Positioning grooves 116 are designed for receiving positioning pins, not shown. The pins in the grooves 116 are used for optical alignment between fiber bundles 18 of two adjoining couplers 10 when an optical coupling therebetween is effected. Further, while most wafers 26, observe FIG. 2, have V-grooves 42 in both of their surfaces 28, the end wafers 26 have only positioning grooves 116 in their respective outside surfaces.) A 35% KOH solution was used to preferentially etch the wafers 26 at a temperature of about 80° C., with an etch rate of about 2.6 micrometers/min. for about 20 minutes, until the (111) planes were fully exposed to form the walls of the V-grooves 42. The dimensions of the V-grooves 42 were as described with reference to FIG. 4. The angular opening of the V-grooves 42, of course, is determined strictly by crystallinity considerations and, it is the supplement of twice the angle between the wafer surface 28 and the (111) plane wall 118 of the V-groove 42. The SiO$_2$ films 110 were then completely removed by etching in H. F. Next and with particular reference to FIG. 6, both sides of the wafers first were covered by a very thin layer 90 of deformable hard glass, such as Corning 7070 glass, by RF sputtering, of four microns thickness, with the glass first lining all the V-grooves and both surfaces. Then, the glass layer was removed from one half of the bonding surfaces 78 and 80 in FIG. 6 so as to achieve a glass-to-silicon bond, care being taken that no part of the glass lining the V-grooves 86 and 88 also is removed in the process. This was achieved by masking the glass in the V-grooves 86 and 88 and etching the surface 80 in HF. Then, optical fibers 20 were positioned in the V-grooves and a plurality of the wafers 26 and the fibers 20 were stacked to form the two-dimensional array, shown in FIG. 2, such that the complementary opposed V-grooves 42 containing the fibers 20 were in registry with one another. The stack was temporarily united by suitable positioning means, such as a single external spring clamp. Then the stack was placed in a microprocessor controlled electrostatic bonder where the stacked wafers were electrostatically bonded to each other along surfaces 78 and 80, as illustrated in FIG. 6, at a bonding temperature between about 500° C. to about 550° C., with an applied pressure of about 500 p.s.i., and a voltage of about 40 volts, all being applied in a suitable vacuum atmosphere for about 30 minutes. The voids surrounding the fibers in the V-grooves were then filled by vacuum impregnation, using Emerson & Cummings Stycast 1264 as the low viscosity filler material. After void filling, the stack was cured for about 16 hours at about 50° C. Next, in order to secure the stack within a coupler for use in a submarine hull penetrator and to provide a seal that can withstand the pressure differentials and potentially explosive environments encountered in submarine applications, the stack was subjected to a submarine-safe epoxy potting. Finally, the stack was subjected to strain relief molding to prevent shearing of the optical fibers at their ends. Eight such sheethed fiber bundles 18 were then assembled into the multichannel fiber optic coupler 10 shown in FIG. 1.

The resultant multichannel fiber optic coupler 10 was characterized by a high degree of reliability, ruggedness, and a quality of optical fiber alignment exhibiting high resolution and low loss.

Thus it has been shown and described a fiber optic coupler 10 for use in optical data transmission systems and a method of its manufacture, which coupler 10 and method satisfy the objects and advantages set forth above.

Since certain changes may be made in the present disclosure without departing from the scope of the present invention, it is intended that all matter described in the foregoing specification or shown in the accompanying drawings, be interpreted in an illustrative and not in a limiting sense.

What is claimed is:

1. A fiber optic coupler comprising:
   (a) a pair of thin wafers, each having at least one complementary opposed V-groove in its surface;
   (b) a very thin layer of deformable hard glass covering the surface and the V-groove of one of said wafers and the V-groove of the other of said wafers; and
   (c) an optical fiber held securely within said complementary opposed V-grooves by said very thin layer of deformable hard glass.

2. The fiber optic coupler of claim 1 wherein said thin wafers are formed of silicon and said V-grooves are formed in their said surfaces by preferential etching.

3. The fiber optic coupler of claim 2 wherein the thermal expansion coefficient of said deformable hard glass layer closely parallels that of said silicon wafers.

4. The fiber optic coupler of claim 2 wherein said silicon wafers are (110) orientation crystal silicon.

5. The fiber optic coupler of claim 2 wherein said silicon wafers are (100) orientation crystal silicon.

6. The fiber optic coupler of claim 1 wherein said optical fiber is formed of non-deformable fused silica.

7. The fiber optic coupler of claim 1 wherein said deformable hard glass layer is formed of Corning 7070 glass.

8. The fiber optic coupler of claim 1 wherein said pair of wafers are electrostatically bonded to each other along their said surfaces.

9. The fiber optic coupler of claim 1 wherein said complementary opposed V-grooves surrounding said optical fiber are filled with a low viscosity material by vacuum impregnation.

10. A multichannel fiber optic coupler comprising:
    (a) a plurality of thin wafers, each formed with two opposed parallel flat surfaces;
    (b) at least one complementary opposed V-groove formed in at least one of said two opposed parallel flat surfaces of each of said plurality of thin wafers;
    (c) a plurality of very thin layers of deformable hard glass being deposited on one of said two opposed parallel flat surfaces of each of said plurality of thin wafers and onto each of said opposed V-grooves;
    (d) said plurality of thin wafers being stacked against each other in a two-dimensional array such that said complementary opposed V-grooves of adjacent wafers are in registry with one another; and
    (e) a plurality of optical fibers held securely within said complementary opposed V-grooves by said very thin layers of deformable hard glass lining said V-grooves.

11. The multichannel fiber optic coupler of claim 10 wherein said plurality of thin wafers are formed of (110) or (100) orientation crystal silicon and said V-grooves are formed therein by crystal orientation dependent etches, with each pair of said complementary opposed V-grooves in registry with one another defining a cavity of rhombic cross section.

12. The multichannel fiber optic coupler of claim 11 wherein said V-grooves are formed by the (111) planes of said crystal silicon wafers.

13. The multichannel fiber optic coupler of claim 11 wherein the thermal expansion coefficient of said layers of deformable hard glass closely parallels that of said crystal silicon wafers.

14. The multichannel fiber optic coupler of claim 10 wherein said plurality of optical fibers are formed of non-deformable fused silica and said layers of deformable hard glass are formed of Corning 7070 glass.

15. The multichannel fiber optic coupler of claim 10 wherein said stacked wafers are electrostatically bonded to each other by said thin layers of deformable hard glass separating said stacked wafers.

16. The multichannel fiber optic coupler of claim 10 further including a low viscosity filler material surrounding each of said plurality of optical fibers held within said complementary opposed V-grooves.

17. The multichannel fiber optic coupler of claim 10 wherein each of said plurality of thin wafers is about 25 mils thick, the depth and the width of each of said V-grooves are about 86 microns and about 244 microns respectively, the thickness of said very thin layers of deformable hard glass is about 4 microns, the range of diameter of said plurality of optical fibers is from about 136 microns to about 144 microns, with a center-to-center fiber spacing of about 1.04 mm.

18. A method of forming a fiber optic coupler comprising:
    (a) providing a plurality of thin crystal silicon wafers;
    (b) forming a plurality of complementary V-grooves in at least one of the surfaces of each of said plurality of wafers;
    (c) depositing a very thin layer of deformable hard glass in said V-grooves and onto one surface of each of said plurality of wafers;
    (d) positioning a plurality of optical fibers into said plurality of complementary V-grooves;
    (e) stacking said plurality of wafers and fibers in said V-grooves to form a two-dimensional array such that said complementary opposed V-grooves of adjacent wafers are in registry with one another; and (f) uniting said stacked wafers, with said fibers securely held within said complementary opposed V-grooves by said thin layers of deformable hard glass lining said V-grooves.

19. The method of claim 18 further including the step of surrounding each of said plurality of optical fibers within said V-grooves by a low viscosity filler material.

20. The method of claim 18 wherein said step of forming said plurality of complementary V-grooves in the surfaces of said plurality of wafers is effected by preferential etching said thin crystal silicon wafers until their (111) planes are exposed.

21. The method of claim 18 wherein said step of depositing said very thin layer of deformable hard glass in said V-grooves and onto said one surface of each of said plurality of wafers is effected by RF sputtering of Corning 7070 glass.

22. The method of claim 18 wherein said step of uniting said stacked wafers is effected by electrostatic bonding at a temperature between about 200° C. to about 500° C. and with an applied pressure of about 200 to about 300 p.s.i.

* * * * *